Figure 1:
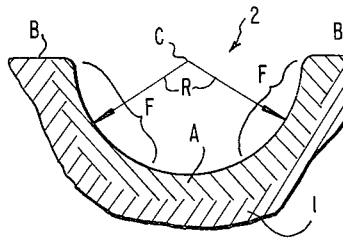

June 8, 1965  T. W. WLODEK  3,187,455
RIFLED GUN BARREL WITH PERMANENT PLASTIC DEFORMATION
SURROUNDING THE FILLETS
Filed Aug. 24, 1959

INVENTOR
TADEUSZ W. WLODEK

BY *Smire and Smiley*
ATTORNEYS

United States Patent Office 3,187,455
Patented June 8, 1965

1

3,187,455
RIFLED GUN BARREL WITH PERMANENT
PLASTIC DEFORMATION SURROUNDING
THE FILLETS
Tadeusz W. Wlodek, 297 5th Ave., Ottawa,
Ontario, Canada
Filed Aug. 24, 1959, Ser. No. 835,559
3 Claims. (Cl. 42—78)

This application is a continuation-in-part of application Serial No. 373,369, filed August 10, 1953, now abandoned, and application Serial No. 551,455, filed December 6, 1955, now Patent No. 3,017,697.

This invention relates to a method of spiral-rolling, forming and machining durable rifling in gun barrels.

Presently used standard methods of machining rectangular rifling-grooves results in premature cracking, at the sharp edges of the rifling-grooves, that shortens substantially the useful life of gun barrels.

It has now been discovered that surprisingly improved properties are produced in gun barrels by creating within the material locked-in residual stresses which work against the stresses imposed upon the structural element as it is used, thus increasing the useful life of the gun barrel, or the load which it is capable of carrying. These locked-in residual stresses are created in gun barrels by different types of apparatus developed for the purpose of applying pressure to portions of the material to give it permanent or so-called plastic deformation and leaving adjacent portions of the material in its normal or elastic form. It appears that the alternate juxtaposition of these regions of plastically deformed material with those in the normal elastic form or practically normal elastic form results in an interlocking of the internal stresses in the treated areas of the material to enable the gun barrel to withstand heavier loads or have a longer useful life.

This new method of forming of rifling is based on the creation of locked-in residual stresses through the introduction of mainly plastically deformed regions in alternate juxtaposition with regions substantially elastically deformed. In general, juxtaposition of regions plastically deformed with regions of lesser plastic deformation, both regions being arranged in a regular form of rifling grooves is the topic of this treatment. The transition in plastic deformation between these two regions may be gradual or abrupt, and the built-in residual stresses are substantially perpendicular to the direction of plastically deformed regions, i.e., direction of rifling. It should be also emphasized that rolling of grooves and depressions in the form of rifling provides, through so-called mutual interlocking phenomena, a controllable mechanism of plastic deformation of treated surfaces, resulting in greatly improved physical qualities of gun barrels treated by this invention.

It is an object of this invention to provide a method for greatly increasing the physical properties of gun barrels by rolling or otherwise impressing grooves or depressions of rifling of various patterns and shapes.

Figure 2:
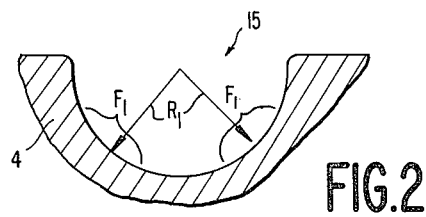
Figure 3:
Figure 4:
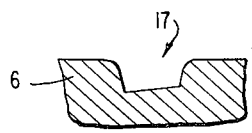

The invention will be described with reference to the accompanying drawings, in which:

FIGURE 1 is an enlarged fragmentary cross-section through a gun barrel through rifling groove and showing sections of plastically deformed metal, each in juxtaposed relation to a section of metal substantially in its normal elastic form, as produced by the invention;

FIGURES 2, 3, and 4 are enlarged fragmentary cross-sectional views of a gun barrel showing various examples of shapes of grooves and depressions in rifling as produced by the method;

FIGURES 5 through 8 are diagrammatic views of types of apparatus, shown within longitudinal sections of a gun barrel, for performing the method, and

2

Figure 9:
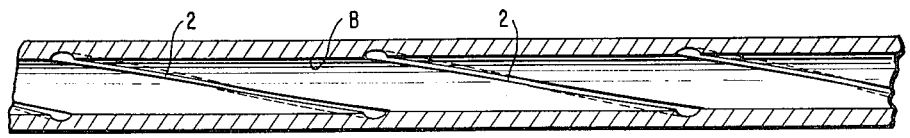

FIGURE 9 is a fragmentary axial section of a gun barrel illustrating the spiral rifling.

In accordance with the invention the physical properties, specially fatigue, corrosion fatigue, stress corrosion, static and dynamic strength, resistance against fretting, wear and erosion of gun barrels are greatly improved by impressing rifling grooves or depressions at spaced intervals thereon, and said intervals being so spaced as to leave between adjacent pairs of grooves or depressions or the like a portion of metal which has not been directly subjected to large deformation.

The effect produced by the method of the invention is characterized by the magnitude and direction of the locked-in residual stresses which are produced in gun barrels under treatment by the different combinations of: force used, direction of the applied force, patterns and their sequence, and the depth, shape and cross-section of the depressions and grooves. In order to increase the effect of our treatment the structural element, if required, could be treated while under stress. The residual stresses thus created are directed against the working stresses imposed on the structural element, with the result that the element has longer useful life and greater capacity to resist the strain caused by the load imposed on the element.

The hollows, grooves or depressions of rifling may be of any desired shape and may be applied by any desired means to various types of gun barrels in a variety of patterns. The grooves or depressions may be impressed by rolling, spiral-rolling, pressing, stamping, hammering, or the like, depending upon the character of the form of rifling and type of gun barrel to be treated. It will be appreciated that the crests and troughs of the depressions or grooves of rifling may be subjected to any subsequent treatment such as machining, grinding, over-rolling or the like. It will be obvious that there are many other practical adaptations of the present invention.

In the enlarged view of FIGURE 1 there is illustrated pictorially the effect of forming rifling, in the inner surface of a gun barrel 1 leaving crests of untreated portions 3 between adjacent rifling 2. The grooves are formed with large radius fillets F having radii R and a center C such that the grooves are substantially semicircles in cross section. As a result of the pressure applied to make the rifling grooves or depressions 2 there is produced in the areas A metal of a permanently deformed character whereas the metal of areas B remains substantially in its original elastic form. The mutual interlocking stresses thus created in the metal are responsible for the great increase in the physical properties of gun barrels treated by the invention. The magnitude of the locked-in compression stresses is controlled by the extent to which the plastically deformed metal is formed in areas A of the rifling and by the relative width of the intervening elastic metal in areas B with lesser amount of plastic deformation.

The magnitude of locked-in compression stresses could be increased by the increase of the depth of the rifling groove which increases the extent of plastic deformation of metal in areas "A" of the rifling. Also the magnitude of the locked-in stresses is influenced by the width of areas "B," or of the lands of rifling, which latter areas are areas with lesser amount of plastic deformation. Reduction of these latter areas increases the locked-in stresses.

When pressure is applied equally to the whole surface of the metal element as in other standard treatments like auto-frettage, the mutually interlocking stresses produced by the present invention are not developed. Auto-frettage is the application to the bore of a gun of such interior pressures as will deform the inner layers of the steel beyond the elastic limit which would be reached by the explosion of any charge to be used subsequently in the gun.

Representative illustrations of the shapes or contours of the hollows, grooves or depressions in the internal rifling of gun barrels 4, 5 and 6 is shown in FIGURES 2, 3 and 4. In FIGURE 2 the gun barrel 4 has a U-shaped groove 15 therein with fillets $F_1$ having radii $R_1$ which are larger than the depth of the groove. In FIGURE 3 the groove 16 is V-shaped and in FIGURE 4 the groove 17 is provided with a frustro-conical bottom as shown. A completed spiral rifling groove 2 having the section shown in FIGURE 1 is illustrated in FIGURE 9.

Various types of apparatus for treating the interior surfaces of and producing rifling in hollow members such as gun barrels 1, 4, 5, 6, a, b and c and the like are illustrated in FIGURES 5 through 8.

Figure 5:
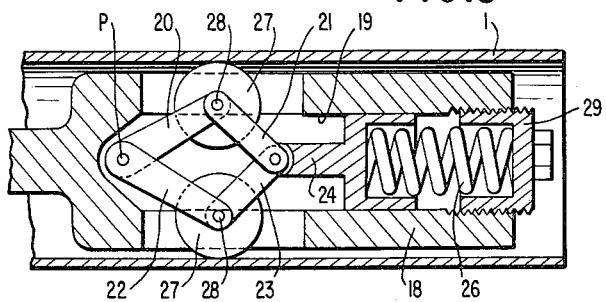

The apparatus shown in FIGURE 5 comprises a frame 18 having a bore 19 in which is mounted a lazy-tong arrangement having pairs of links 20, 21 and 22, 23 pivotally joined by axles 28 journaling corresponding rollers 27. The ends of links 20 and 22 remote from the axles 28 are pivotally joined to frame 18 by pin p while the ends of links 21 and 23 remote from the axles 28 are pivotally joined by a pin r carried by a slidable support 24 biased by a spring 26 mounted in the frame 18, and which is adjustable by means of a plug 29 threaded in the bore 19 to provide the necessary radial force to the rollers.

Figure 6:
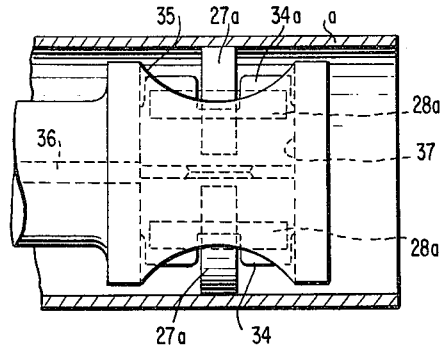

The apparatus shown in FIGURE 6 comprises a frame 35 having a transverse cylindrical bore 37 in which is mounted a pair of pistons 34. Each piston carries an axle 28a on which is rotatably mounted a roller 27a. Hydraulic pressure is applied through opening 36 to the pistons 34 and thus supplies the necessary force on the pistons and rollers 27a to effect the rifling of gun barrel a. If desired this apparatus may be altered to one having a fixed diameter by simply removing the hydraulic line and placing the required number of shims, plates or flat springs between the inner ends of the pistons. It will be obvious that any suitable arrangement to maintain the rollers in proper relation to the surface to be treated and to prevent the pistons from expanding beyond a safe limit, if required could be provided.

Figure 7:
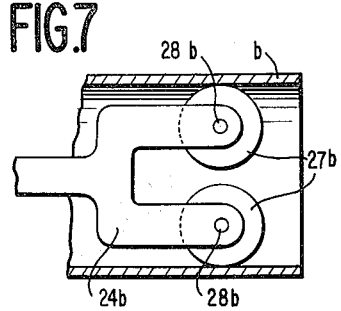
Figure 8:
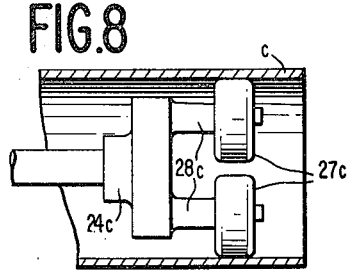

The structure shown in FIGURE 7 comprises a supporting head 24b carrying a pair of rotatably mounted rollers 27b in fixed parallel relation on axles 28b transverse the barrel b and the structure shown in FIGURE 8 comprising a head 24c carrying axles 28c, on which rollers 27c are mounted in fixed parallel relation longitudinally of the barrel c.

The mechanism for effecting relative motion between the gun barrel and the tool forms no part of the present invention although obviously, such mechanism must be effective to produce a combined rotary and linear motion relatively between these two members, and for this purpose, any mechanism or arrangement for effecting such relative motion between the gun barrel and the tool may be utilized. For example, any conventional machine such as a universal broaching machine as normally used for cutting rifling in gun barrels, may be utilized for effecting the relative motion between the gun barrel and the tools illustrated in FIGS. 5–8. If the tool is pulled or pushed linearly with respect to a barrel and the barrel rotated, or if the barrel is moved longitudinally with respect to a rotated tool, or if a combination of rotary and translatory motion is applied to either the tool or the barrel, a rounded cross-section, spiral rifling groove will be formed in the barrel by rolling pressure of the rollers 27, 27a or 27b, said pressure of the rollers against the barrel inherently causing the rollers to turn during relative movement of the tool and the barrel.

An additional feature of this invention is the provision of an improved durable rifling shaped in the form of a substantially rounded groove as shown in FIGURES 1 and 2. These round-shaped rifling grooves may be formed either by machining or by pressure, or a combination thereof, and they eliminate large stress-concentrations existing in the presently used standard rectangular rifling similar to that shown in FIGURE 4. The introduction of rifling-grooves with large fillets at both edges, with radii substantially equal to or greater than the depth of the groove, in half-moon shaped rifling, is a very effective method of increasing the strength of that type of gun barrel and rifling.

The rolling of the rifling grooves preferably is effected at temperatures below that of recrystallization.

Although certain specific embodiments of the invention have been shown and described it is obvious that many modifications thereof are possible insofar as is necessitated by the prior art and by the spirit of the appended claims.

I claim:
1. A gun barrel having spiral rifling grooves of constant dimensions throughout their length and with fillets at the junction of the bottoms with the side walls of the grooves, the metal areas of the barrel immediately surrounding said fillets being permanently, plastically deformed by pressure to a greater degree than the barrel metal outside said areas.

2. A metal gun barrel having spiral rifling grooves of constant dimensions throughout their length and with fillets at the junctions of the bottom with the side walls of the grooves, said fillets having radii at least equal to the depth of the grooves, the metal areas of the barrel immediately surrounding said fillets being permanently, plastically deformed by pressure to a greater degree than the barrel metal outside said areas.

3. A gun barrel having spiral rifling grooves of constant dimensions throughout their length and of a cross section shaped substantially in the form of a segment of a circle, the metal areas of the barrel immediately surrounding said grooves being permanently, plastically deformed by pressure to a greater extent than the remaining areas of the barrel metal which retain their elastic property.

References Cited by the Examiner
UNITED STATES PATENTS

| | | | |
|---|---|---|---|
| 9,830 | 7/53 | Lancaster. | |
| 16,377 | 1/57 | Dimick | 42—78 |
| 37,924 | 3/63 | Steece | 42—78 |
| 105,736 | 7/70 | Stimers | 42—78 |
| 296,958 | 4/84 | Hebler. | |
| 689,502 | 12/01 | Markham | 29—1.1 |
| 2,089,219 | 8/37 | Moore | 42—78 |
| 2,104,319 | 1/38 | Dicke | 29—1.1 |
| 2,295,272 | 9/42 | Somes. | |
| 2,541,116 | 2/51 | Somes | 42—76 |

FOREIGN PATENTS 1,872   8/60   Great Britain.

BENJAMIN A. BORCHELT, *Primary Examiner.*

SAMUEL BOYD, THOMAS E. BEALL, *Examiners.*